A. AVRIN.
RECORDING SYSTEM AND APPARATUS.
APPLICATION FILED JAN. 20, 1916.

1,210,752. Patented Jan. 2, 1917.

Witnesses

Inventor
A. Avrin
By Attestonhaughs Co
Att'ys.

UNITED STATES PATENT OFFICE.

ABRAHAM AVRIN, OF MONTREAL, QUEBEC, CANADA.

RECORDING SYSTEM AND APPARATUS.

1,210,752. Specification of Letters Patent. Patented Jan. 2, 1917.

Application filed January 20, 1916. Serial No. 73,170.

*To all whom it may concern:*

Be it known that I, ABRAHAM AVRIN, a subject of the Czar of Russia, and resident of the city of Montreal, in the Province of Quebec and Dominion of Canada, have invented certain new and useful Improvements in Recording Systems and Apparatus, of which the following is a full, clear, and exact description.

This invention relates to improvements in recording devices, and the object of the invention is to provide means for recording or tallying the amount of goods sold, and also for keeping track of the prices at which sales are effected and the amount of purchases, so that a merchant will be able to check up the amount of goods sold with money received, and will also be able to ascertain very readily the amount of any given commodity in stock.

The invention consists essentially of an apparatus comprising a number of similar mechanical counting or tallying units. These units may be disposed in any suitable manner, that is to say, they may be arranged all in a single cabinet or may be attached singly to the receptacles holding the various commodities to be sold. Each unit consists essentially of a casing containing a scale, a worm shaft, and a nut operable by the worm shaft to travel past the scale, thus indicating the amount sold. Revolution of the worm is manually effected, each revolution representing for instance a unit of measure of the particular article. In order to gage the revolutions accurately, a scale and pointer are provided so that fractions of units may be accurately effected.

Figure 1:
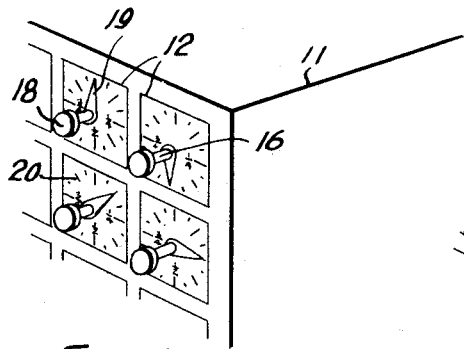
Figure 2:
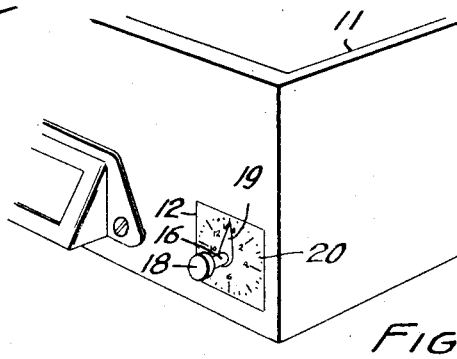
Figure 3:
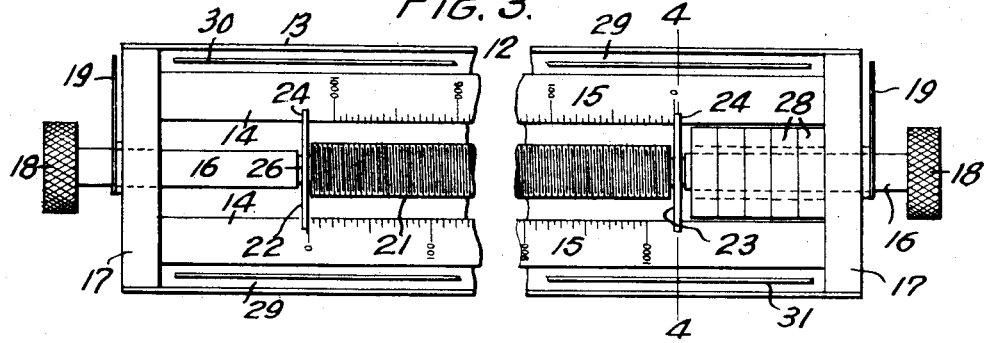
Figures 6, 7:
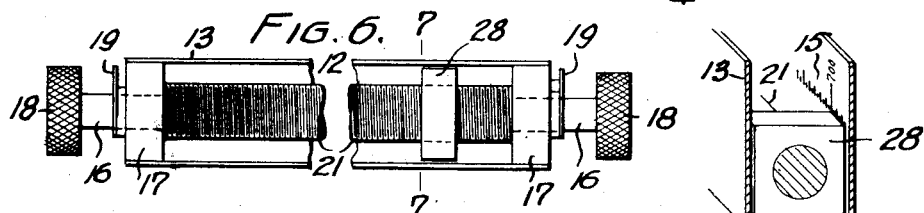
Figures 4, 5:
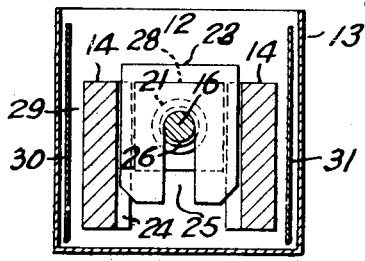

In the drawings which illustrate the invention:—Figure 1 is a fragmentary perspective view of a cabinet containing a plurality of tallying units. Fig. 2 is a fragmentary perspective view of a merchandise container provided with a tallying unit. Fig. 3 is a plan view of a single unit. Fig. 4 is a section on the line 4—4, Fig. 3. Fig. 5 is a plan view of the record cards used in connection with each unit. Fig. 6 is a plan view of a slightly modified form. Fig. 7 is a section on the line 7—7, Fig. 6.

Referring more particularly to the drawings, 11 designates a container which may be either a cabinet adapted to contain a plurality of tallying units or a merchandise container carrying only a single unit. Each of the units, designated as a whole, by the numeral 12, comprises a box-like casing of suitable dimensions open at the top. Within the casing, a pair of longitudinal guides 14 are provided one or both of which carries a scale 15 graduated in any suitable manner. As will be seen, the scale stops and starts some distance short of the ends of the casing. Midway between the guides, a revoluble shaft 16 is mounted extending from end to end of the casing and journaled in the ends. At the ends 17, the spindle projects beyond the casing and is provided at each end with a suitable head 18, by means of which it may be manually rotated. A pointer 19 is also provided on each end of the spindle externally of the casing and arranged to travel over a circular scale 20, suitably divided according to the unit of measurement upon which the device operates. For example, in the drawing, Figs. 1 and 2, the scale represents a pound, and the sub-divisions, ounces and fractions thereof. It will be obvious, however, that this scale may represent ounces, and the fractions, grains or drams. The scale may equally well represent any measurement of weight, length or capacity, that may be desired. It is equally obvious that the scale 20 may represent a plurality of units of measure, as for instance, ten pounds in place of one pound. This arrangement will be advisable for commodities which are customarily sold several pounds at a time, such as sugar, flour and the like. This will obviously have the effect of giving the tallying unit greater capacity. The scale 15 represents multiples of the scale 20 and reads in a manner similar to the scale 20. The spindle 16 is provided with a continuous thread 21 extending at least the length of the scale. Beyond the ends of the thread, the spindle is of less diameter than at the bottom of the threads, so that a nut which engages the threads will slide freely on the spindle beyond the thread. At each end of the scale 15, slotted stops 22 and 23 are mounted between the guides 14 in grooves 24. Each of these stops has a slot 25 extending upwardly from the bottom, the closed end of which engages the threadless portion of the spindle. For convenience, the spindle may be provided with a slight groove 26 in which the edges of the stop around the slot engages, so as to prevent the stop by any possibility engaging the thread of the spindle. This arrangement also provides thrust bearings for the spindle, which hold it independent of any means, such as a retaining nut 27 at the rear end. A plurality of nuts or counters 28 threaded to coöperate with the thread 21 are provided, and when the device is new, are positioned on the threadless portion of the spindle between the back stop 23 and the end of the casing.

It will be noted that at each side of the casing, a space 29 is left between the guides 14 and the sides of the casing. This space forms a suitable receptacle for record cards, designated 30 and 31, and shown in Fig. 5. The card 30 is for the purpose of keeping a record of price changes, and is especially necessary in grocery and similar businesses where price fluctuations are constant. This card contains columns for the date of a price change, the quantity sold to date, as indicated by the device, and the new price. The stock card 31 contains columns for the date, the amount of material put into stock, and the price paid for same.

In Figs. 6 and 7, a slightly modified form of the invention is shown, in which the guides 14 are eliminated, and the scales 15 placed on the casing 13, which also operates to hold the counter against revolution. This form will obviously preclude the storing of the cards 30 and 31 in each unit. It will be seen that the stops 22 and 23 are missing in this form of the device, and that only a single nut is used. In either of the forms shown, when the limit of the device is reached, a suitable record is made and the unit merely turned end for end in the container 11. It will be obvious that any desirable combination of the two forms may be resorted to.

Assuming the device is being put into operation for the first time, all the counters 28 will be at the rear of the unit behind the back stop. The spindle 16 is set, so that the pointer 19 stands at 0 on the scale 20, the back stop 23 is then pulled out, the first counter slipped into engagement with the thread 21 and the back stop replaced, thus separating this single counter from the remainder. The rear face of the counter now stands opposite 0 on the scale 15. An entry is made on the card 30 of the date, the amount sold to date, which is nothing, and the price at which the commodity is to be sold. An entry is also made on the stock card 31 of the date, the amount of commodity in stock, and the cost price of same. As each sale is made, the spindle is manually rotated in accordance with the scale 20 to indicate the quantity sold. Rotation of the spindle causes the nut, which is held against revolution by the guides, to advance toward the front of the unit. It is obvious that by the use of a very fine thread, each revolution of the spindle will produce almost imperceptible movement of the counter, so that a great number of revolutions must be imparted before the counter reaches the front of the scale and is checked by the front stop 22. This stop is carefully positioned with respect to the scale and the thickness of the counters being accurate, it is obvious that the device will cease to register when the limit of its capacity is reached. Indication of this is immediately given by the resistance to operation. To continue the use of the scale, the front stop 22 is drawn out, the counter slipped on to the threadless front portion of the spindle, and the front stop replaced. The back stop 23 is next removed and a fresh counter started on the thread. Thus, a merchant by observing the number of nuts or counters at the front end of the unit may determine how many times the device has been operated. The quantity sold is determined by multiplying the capacity of the scale 15 by the number of counters at the front, and then adding the reading opposite the rear face of the counter engaging the thread. When a change of price is put into effect, the date, the total reading of the device, for instance, 15,200, and the new price, are inscribed on the card 30. This indicates that on a certain date, 15,200 units of measurement of a certain commodity had been sold at the price already inscribed. When the next change of price goes into effect, the date, the total reading, for instance 22,100, and the new price, are inscribed. Thus, by subtracting the former reading from the latter the amount sold at the first change of price may be readily determined, which is 7,100. By adding the records of the stock card and subtracting from the total the reading of the device, the merchant may ascertain in a few seconds' time the amount of the particular commodity still in stock. It will be apparent that by the use of this device, the amount of material in stock will be readily ascertained without the necessity of keeping a stock book, which for businesses such as groceries and the like, where a large number of small sales are made, is a tremendously laborious work, and with ordinary methods does not readily show the amount of stock on hand. By the use of this device, which keeps only totals, the amount on hand at any moment of the day may be very easily ascertained. By a comparison of the price card 30 and the scale 15, the merchant may determine in a few seconds the amount of sales which should tally with the cash on hand and accounts charged. When all the counters of the form shown in Fig. 3, or the single counter of the form shown in Fig. 6, have been brought to the front, a suitable indication is made and the unit turned end for end and operated as previously described. For this purpose, the scales 15 are provided in duplicate each reading from one end of the device.

It is obvious that a number of modifications and minor changes may be made in the device, which cannot be contemplated in advance, for the purpose of adapting the device to particular requirements. All such changes and modifications are, however, considered as merely equivalents and are therefore covered by the following claims.

Having thus described my invention, what I claim is:—

1. In a device of the character described, a casing, a spindle revolubly mounted therein having a portion of its length threaded, a plurality of counters mounted on the unthreaded portions of the spindle and adapted for engagement with the thread, a scale past which said counters are moved by spindle revolution, and means for holding counters not in use out of engagement with the spindle thread.

2. In a device of the character described, a casing, a spindle revolubly mounted therein, a thread formed in the central portion of said spindle, internally threaded counters slidable on the ends of the spindle into and out of engagement with the thread, and movable stops regulating the engagement and disengagement of the counters with the thread.

3. In a device of the character described, a casing, a spindle revolubly mounted therein, a thread formed on the central portion of said spindle, a plurality of counters internally threaded for engagement with the spindle thread slidable on the unthreaded end portions of the spindle, a guide parallel with the threaded portion of the spindle adapted to hold the counters against revolution whereby said counters may be moved on the thread only by spindle revolution, a scale for gaging spindle revolution, a scale adjacent the counter path being a multiple of the first scale, and means for limiting the engagement and disengagement of counters with the spindle thread.

4. In a device of the character described, a casing, a spindle revolubly mounted therein, a thread formed in the central portion of said spindle of larger diameter than the end portions, guides parallel with the spindle, a plurality of counters slidable on the unthreaded end portions of said spindle internally threaded for coöperation with the spindle thread, a stop at each end of the thread slotted to embrace the spindle and slidably mounted in the guides, a scale on one of said guides, a scale on the exterior of the casing, a pointer carried by the spindle traveling over said second scale, and means holding the spindle against longitudinal movement in the casing.

In witness whereof, I have hereunto set my hand, in presence of two witnesses.

ABRAHAM AVRIN.

Witnesses:
S. R. W. ALLEN,
G. M. MORELAND.

Copies of this patent may be obtained for five cents each, by addressing the "Commissioner of Patents, Washington, D. C."